Dec. 17, 1963        C. FELDMAN        3,114,868
ELECTRICAL ARTICLE COMPRISING A THIN FILM OF BARIUM TITANATE
Original Filed June 7, 1956
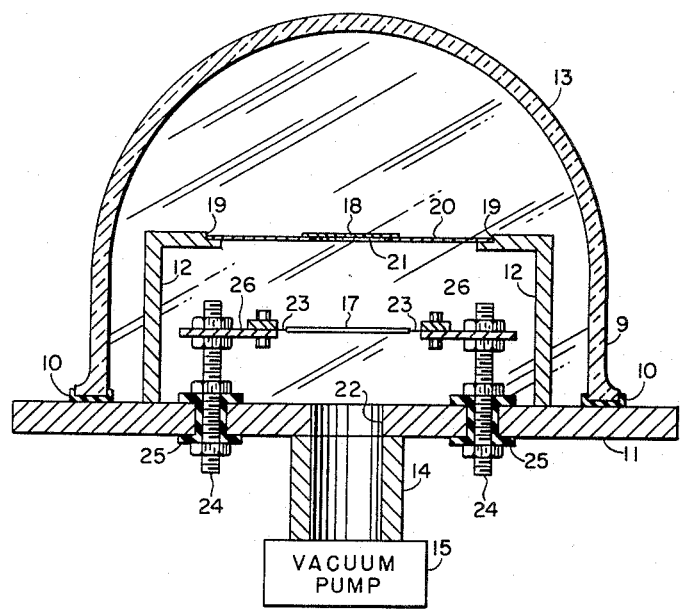
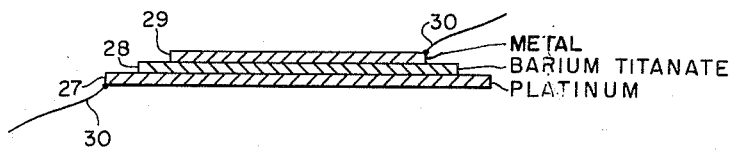
INVENTOR
CHARLES FELDMAN
BY
ATTORNEYS

United States Patent Office 3,114,868
Patented Dec. 17, 1963

3,114,868
ELECTRICAL ARTICLE COMPRISING A THIN
FILM OF BARIUM TITANATE
Charles Feldman, Alexandria, Va., assignor to the United
States of America as represented by the Secretary of the
Navy
Original application June 7, 1956, Ser. No. 590,075, now
Patent No. 2,922,730, dated Jan. 26, 1960. Divided
and this application July 24, 1957, Ser. No. 673,991
4 Claims. (Cl. 317—258)
(Granted under Title 35, U.S. Code (1952), sec. 266)

The invention described herein may be manufactured and used by or for the Government of the United States of America for governmental purposes without the payment of any royalties thereon or therefor.

The present invention is a division of application Serial No. 590,075, filed June 7, 1956, now Patent Number 2,922,730, and relates to electric current devices formed by thin films of barium titanate on a substrate serving as one of the electrodes.

Recent work on the properties and applications of ferroelectric barium titanate ($BaTiO_3$) has indicated a need for very thin films of this material. A very thin film of barium titanate has the advantages of requiring only a small polarization voltage and of dissipating heat easily, thereby eliminating thermal hysteresis effects. Grinding or growth techniques for the formation of thin sections of barium titanate are inherently limited in their minimum attainable thickness. Films as thin as 0.3 mil have been made on platinum by a slip method. These films, however exhibit low dielectric strength which makes them difficult to study.

It is an object of the present invention to provide a new electrical article involving a pair of electrodes and a thin film of barium titanate coated on a substrate serving as one of the electrodes.

It has been determined that the above and other objects and advantages of the invention can be accomplished through the practice of this invention in which barium oxide and titanium oxide are vaporized and deposited onto a suitable substrate under a high vacuum and the resulting deposit or film on the substrate baked in a separate operation in the presence of air or other oxygen-containing inert gas to form barium titanate in the film. The property of barium titanate to decompose as it is evaporated in a vacuum prevents direct formation of a film of barium titanate on a substrate by vapor transfer of the same.

The electrical elements of the present invention are formed with thin films of an order of thickness of 1 to 2 microns which are definitely ferroelectric and are similar to the bulk barium titanate in dielectric behavior. The substrate for the film may be platinum, alumina, silicon carbide or other refractory material which has the added property of being resistant to oxidation, i.e., is capable of withstanding oxidation at the high temperatures used in baking of the film. Platinum is preferred as the substrate because of its electrical conductivity.

The evaporation and deposition of the barium oxide and titanium dioxide onto the substrate can be carried out in any vessel capable of withstanding a high degree of vacuum, e.g., of the order of about $5 \times 10^{-5}$ mm. Hg or less. A suitable source of the vaporized barium oxide and titanium dioxide is barium titanate. For the purposes of dissociating the barium titanate into the component vapors of barium oxide and titanium dioxide and deposition of the vapors onto the substrate, the barium titanate is provided as a thin coating on a refractory wire filament which is mounted in the vacuum vessel and connected to a source of suitable current.

In the accompanying drawings forming part of the description of the present invention there is shown by way of illustration apparatus suitable for carrying out the formation of the electrical articles of the present invention embodying a ferroelectric film of the invention.

In the drawings:

FIG. 1 is a partly sectional view of a vacuum vessel showing an arrangement of the substrate and means for supplying vaporized barium oxide and titanium dioxide thereto, and FIG. 2 shows an electrical article employing a thin ferroelectric film of barium titanate, the sections of the element being shown in exaggerated thickness for purposes of illustration.

Referring to FIG. 1, a vacuum vessel 9 is shown in the form of the conventional bell jar type having a supporting platform 11 which serves as the bottom seal or enclosure for the bell 13 through the use of a rubber gasket 10. Mounted on the platform 11 is a pair of uprights 12 having an inturned arm and a recessed portion 19 at the end of the arm. A circular frame 20 provided with a central opening 21 is seated in the recesses 19. For the coating operation the substrate 18 is placed over the opening 21 and supported by the adjacent portions of the frame in position to receive the vaporized barium oxide and titanium dioxide on the bottom face thereof. The platform 11 is suitably a flat, smooth finished plate of cold rolled steel which is of a thickness to withstand the applied vacuum. The uprights 12 and frame 20 may be made of stainless steel. The bell 13 is made of any suitable material which will withstanding high vacuum pressures, preferably, glass because of the visibility which glass affords.

The vacuum is provided in the vessel 9 through the outlet tube 14 of steel which is welded to the plate 11 in registry with the opening 22 in the latter. A vacuum pump or pumps 15 is operatively connected to the tube 14 in any suitable manner.

A source of barium oxide and titanium dioxide is shown at 17 in the form of a coating of barium titanate on a tungsten filament 23. The coating can be applied to the tungsten filament by mixing a fine powder of the barium titanate with alcohol to form a paste and coating the paste evenly on the filament and allowing it to dry in the air. A tungsten wire filament of about 1.4 mm. diameter is suitable for the purpose. The tungsten wire is supported in the vacuum vessel 9 by means of a pair of electrodes 24 which may be of any suitable construction, such as that shown which is formed of a threaded bolt and binding nuts with insulators 25 interposed to insulate the assembly from the platform 11 to which it is attached. A plate 26 attached to the electrodes 24 by means of binding nuts extends laterally inward and is provided with a binding post to which the tungsten filament 23 carrying the barium titanate coating 17 is attached. A source of suitable current is connected to the electrodes 24 in operation of the apparatus.

For carrying out the formation of the electrical elements, of the invention, the substrate to be coated is chemically cleaned, placed in the vacuum chamber 9 and with the filament is outgassed under vacuum at a temperature of 500° C. or more for one hour. Heating of the vacuum chamber for this purpose may be done by means of inductive heating.

For coating the substrate 18, which for purposes of illustration is shown as a platinum strip having dimensions approximately 1 x 2 x .02 cm., the barium titanate 17 is evaporated from the filament 23 by heating the latter to a temperature substantially above the vaporization temperature of the barium titanate at the vacuum employed, which may be $5 \times 10^{-5}$ mm. Hg and lower. Using a tungsten filament of 1.4 mm. diameter, a current of about 100 atmospheres will effect the evaporation and production of vapors of barium oxide and titanium dioxide. The barium oxide component has the higher vapor pressure and consequently deposits onto the substrate first. The filament is continuously heated until vapors of the titanium dioxide components have been produced and deposited onto the substrate. In order to obtain the correct relative proportions of the components in the film deposited on the substrate, the evaporation process must be carried out to completion. The coating on the substrate varies from BaO at the substrate-film interface to $TiO_2$ at the film-air interface with varying composition in between.

After the substrate has been coated by the evaporation technique, the substrate and accompanying film is removed from the vacuum vessel 9 and baked in air or other oxygen-containing inert gas at a temperature and for a period of time sufficient for the Ba or Ti components to diffuse easily throughout the film. A general temperature range for the heating is from about 1000 to 1500° C. with a preferred temperature range being from about 1,200 to 1300° C. The high heat unites the BaO and $TiO_2$ to form barium titanate in the film on the substrate. Baking of the deposited film on the substrate can be accomplished in an ordinary electric furnace.

The grain size of the barium titanate in the film is influenced by the temperature and the time of baking which affects the Curie transition for the film, the height and sharpness of which depends to a large extent on the variation in the grain size. High baking temperatures cause larger grain growths and consequently, higher transition peaks. The room temperature value of the dielectric constant of the film also increases as the baking time and temperature is increased. A preferred baking schedule is one of 4 hours at a temperature of 1200° C. which favors the production of films with a high dielectric constant. Films can be formed which are so thin that even a voltage of 0.5 volt produces a field of approximately 300 v./cm. across the same. The high field thus produced causes a polarization of the crystallites composing the film and a plot of polarization vs. field yields hysteresis loops.

FIG. 2 shows an article of electrical application of my invention which is formed by the use of a barium titanate film applied to a substrate by the described evaporation process. The barium titanate film 28 of a thickness on the order of 1 to 2 microns is shown as deposited upon the substrate 27 which may be platinum or other electrically conductive, oxidation resistant, refractory material having a film 29 of gold, silver or other electrically conductive metal thereon. A lead wire 30 is attached to each of the electrodes 27 and 29 by any suitable means. Such articles can be used as memory elements, thermal detection elements, dielectric amplifiers, non-linear electrical circuit elements, or as condensers.

Since various changes and modifications may be made in the practice tof the invention without departing from the spirit or scope thereof, it is not intended that the scope of the invention shall be limited except as may be required by the appended claims.

What is claimed is:

1. An electrical article which comprises a metallic base electrode, a dielectric layer of barium titanate of a thickness of the order of 1 to 2 microns with ferroelectric properties coated onto said metallic base electrode, and an electrode applied to said dielectric layer on said metallic base electrode.

2. An electrical article which comprises a metallic base electrode, a dielectric layer of barium titanate of a thickness of the order of 1 to 2 microns with ferroelectric properties coated onto said metallic base electrode, and an electrode, made of gold, applied to said dielectric layer on said metallic base electrode.

3. An electrical article which comprises a metallic base electrode, a dielectric layer of barium titanate of a thickness of the order of 1 to 2 microns with ferroelectric properties coated onto said metallic base electrode, and an electrode made of silver applied to said dielectric layer on said metallic base electrode.

4. An electrical article which comprises a base electrode made of platinum, a dielectric layer of barium titanate of a thickness of the order of 1 to 2 microns with ferroelectric properties coated onto said platinum base electrode, and an electrode made of gold applied to said dielectric layer on said platinum base electrode.

References Cited in the file of this patent

UNITED STATES PATENTS

| | | |
|---|---|---|
| 2,384,541 | Fruth | Sept. 11, 1945 |
| 2,507,253 | Howatt | May 9, 1950 |
| 2,614,524 | Haynes | Oct. 21, 1952 |
| 2,648,823 | Kock et al. | Apr. 11, 1953 |
| 2,734,478 | Reynolds et al. | Feb. 14, 1956 |
| 2,758,267 | Short | Aug. 7, 1956 |
| 2,841,508 | Roup et al. | July 1, 1958 |

FOREIGN PATENTS

| | | |
|---|---|---|
| 691,240 | Great Britain | May 6, 1953 |

OTHER REFERENCES

Pulvari: "Ferroelectrics and Their Memory Applications," I.R.E. Transactions—Component Parts, volume CP–3, No. 1, March 1956, pages 3–11.

Article: "Bonding of Thin Films," Journal of Applied Physics, vol. 23, No. 10, October 1952, pages 1170–1173.